E. A. DEWALD & A. ROSENSON.
MECHANICAL MOVEMENT.
APPLICATION FILED JUNE 3, 1911.
1,020,968.
Patented Mar. 26, 1912.
2 SHEETS—SHEET 1.
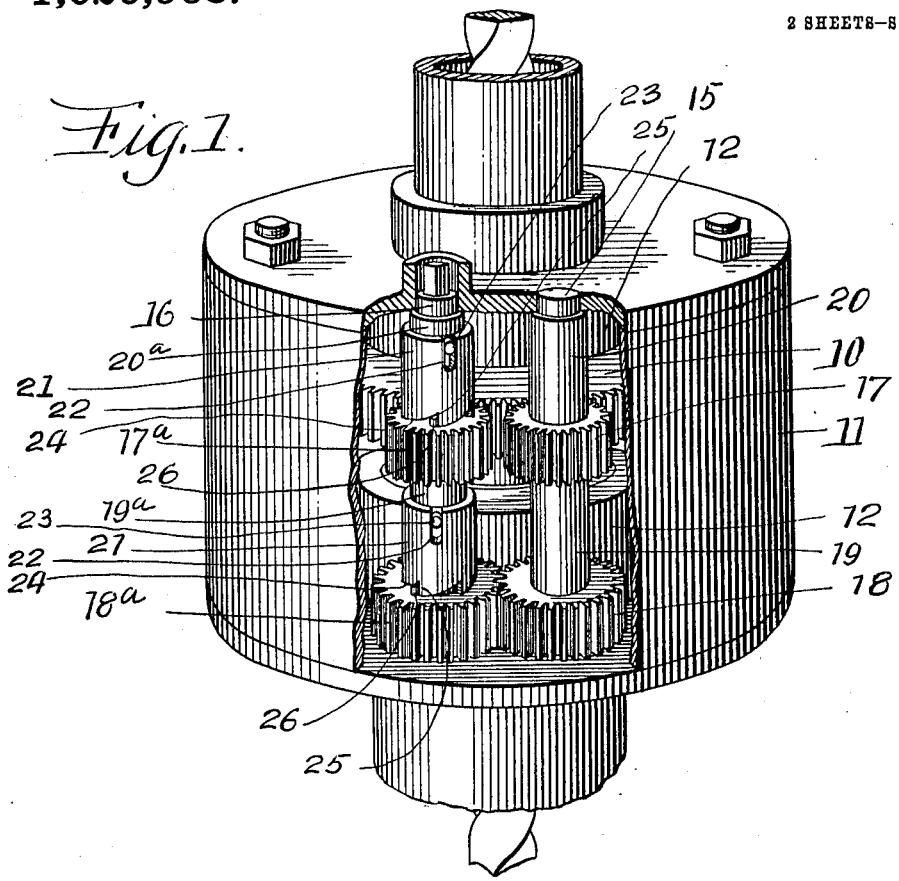
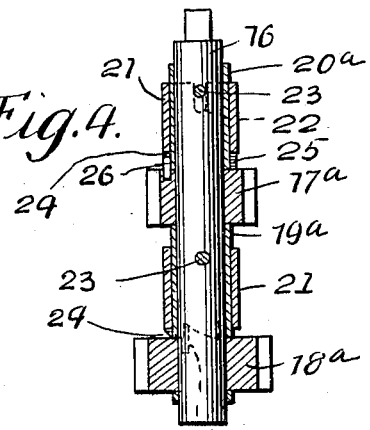
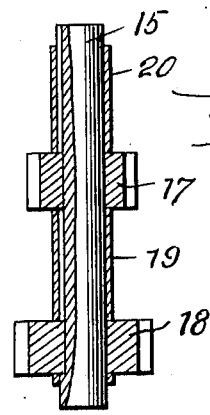
WITNESSES:
Samuel Payne
K. H. Butler
INVENTORS
E. A. Dewald
A. Rosenson
BY
ATTORNEYS E. A. DEWALD & A. ROSENSON.
MECHANICAL MOVEMENT.
APPLICATION FILED JUNE 3, 1911.
1,020,968.
Patented Mar. 26, 1912.
2 SHEETS—SHEET 2.
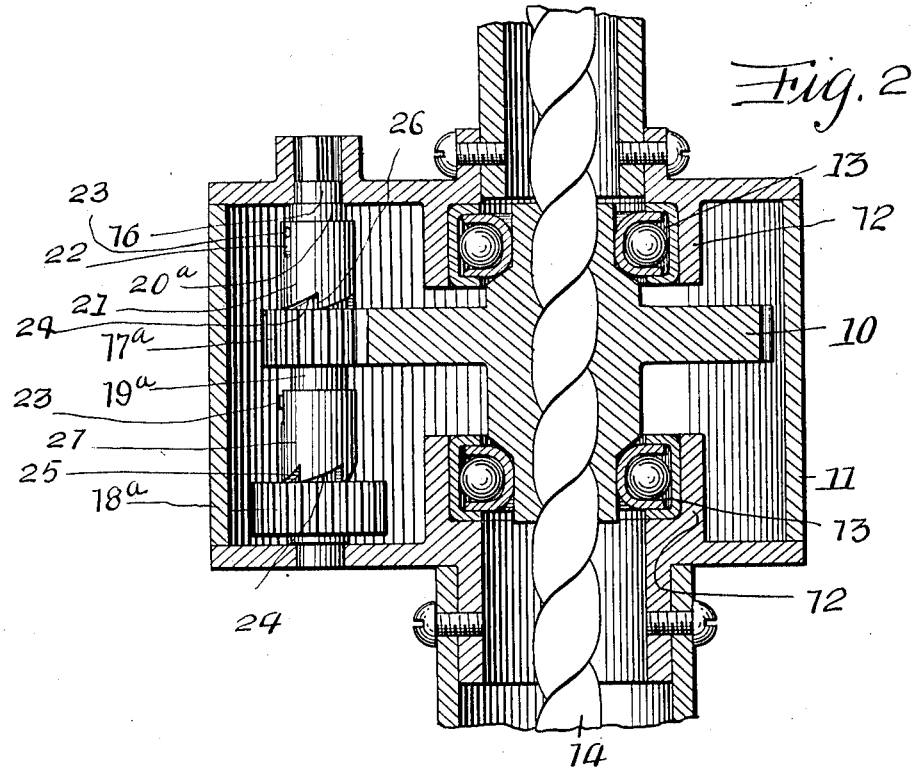
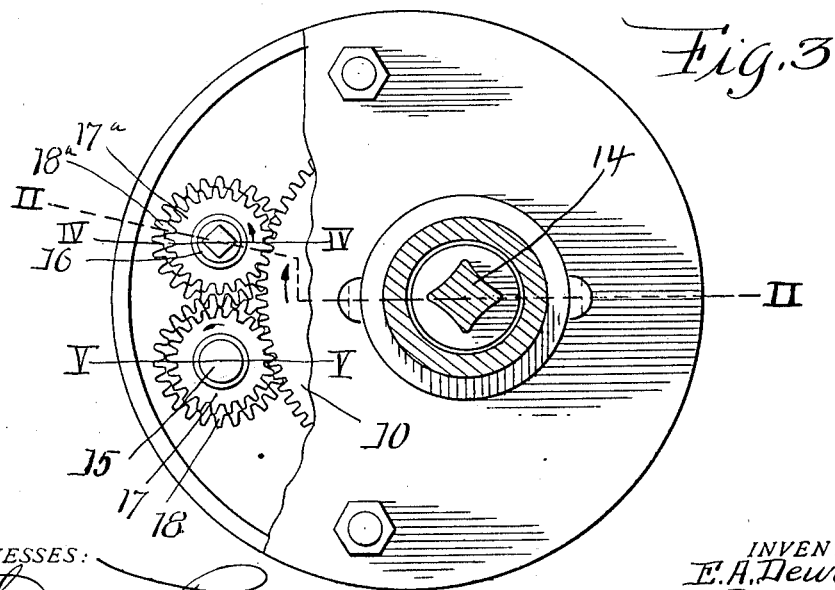
WITNESSES:
INVENTORS
E. A. Dewald
A. Rosenson,
BY
ATTORNEYS

UNITED STATES PATENT OFFICE.

EDWARD A. DEWALD, OF LEETSDALE, AND AARON ROSENSON, OF AMBRIDGE, PENNSYLVANIA.

MECHANICAL MOVEMENT.

1,020,968.  Specification of Letters Patent.  Patented Mar. 26, 1912.

Application filed June 3, 1911. Serial No. 631,045.

*To all whom it may concern:*

Be it known that we, EDWARD A. DEWALD, a citizen of the United States, and resident of Leetsdale, county of Allegheny, and State of Pennsylvania, and AARON ROSENSON, a citizen of the United States, and a resident of Ambridge, county of Beaver, and State of Pennsylvania, have invented a new and useful Mechanical Movement, of which the following is a specification.

Our invention relates to improvements in mechanical movements, and has particular relation to devices for converting motion.

The principal objects of our invention are;—First. To provide a mechanism by means of which an oscillatory motion will be converted into a continuous rotary motion. Second. To provide mechanism for converting a reciprocating motion to a continuous rotary motion through an oscillatory motion. Third. To provide mechanism for converting oscillatory motion provided by a single gear into continuous rotary motion of a shaft extending in parallelism to the axis of such gear.

Other objects of the invention are to provide a device of this character embodying a minimum number of parts so arranged as to occupy a comparatively small space, which is simple and efficient in operation, durable in construction, practically noiseless, and which can be manufactured at a relatively low cost.

To these and other ends, the nature of which will be readily understood as the invention is hereinafter disclosed, our invention consists in the improved construction and combination of parts hereinafter fully described, illustrated in the accompanying drawings, and particularly pointed out in the appended claims.

In the accompanying drawings in which similar reference characters indicate similar parts in each of the views,—Figure 1 is a perspective view of a device embodying our invention, a portion of the casing being broken away for the purpose of showing portions of the operating mechanism. Fig. 2 is a vertical sectional view taken on the line II of Fig. 3. Fig. 3 is a top plan view of the device with a portion of the top plate broken away, and showing the operating rod and a tubular casing therefor in section. Figs. 4 and 5 are sectional views taken on the lines IV—IV and V—V respectively of Fig. 3.

The present invention is intended to be used as a motion-converting device as a part of mechanism to be employed for various purposes, the particular purpose not being essential so far as the present invention is concerned. Nor is it particularly essential to the operation of the device what particular driving means is employed for providing an oscillatory movement to the oscillating gear, the disclosure herein being that of a spiral, the gear of which is complementally formed to coöperate with the spiral in such manner that a reciprocating movement of the latter will impart an oscillatory movement to the gear; it will be obvious that any other desired means may be provided for imparting the oscillatory movement to such gear.

The oscillating gear is designated as 10 and will be referred to as the power gear. As shown in the drawings, this gear is mounted in a casing, indicated as 11, in which the various operating parts are mounted, said casing having its top and bottom walls provided with annular flanges 12 in which are seated ball-races 13 which serve as antifriction devices for the gear 10. For the purpose of readily assembling the parts, the top of the casing is made removable, being secured to the remainder of the casing by suitable bolts or equivalent means. As showing one way in which the oscillatory movement may be imparted to the gear 10, we show a spiral 14 which is adapted to be reciprocated in any suitable manner, and the gear 10 is formed complementally to the spiral so that the reciprocating motions of the spiral will cause the gear 10 to oscillate on its axis.

15 and 16 designate two (2) spaced-apart shafts extending in parallelism with the axis of the gear 10, one of which shafts (15) will be designated as the oscillatory shaft, while the other (16) will be designated the rotary shaft, the latter having its movements continuous in one direction. The latter shaft has its upper end suitably formed for the purpose of attaching through a shaft or other connection by means of which the rotary motion of the shaft 16 will be communicated to the work to be performed. The shafts 15 and 16 carry the mechanism by means of which the oscillatory motion of the gear 10 is converted into the rotary motion of the shaft 16. This particular mechanism will now be described.

As shown in Fig. 5, the shaft 15 is provided with two pinions 17 and 18 respectively, these pinions being preferably operated by a collar 19, said pinions being of unequal diameter, the pinion 18 having a diameter greater than that of pinion 17, both pinions being preferably keyed or otherwise secured to the shaft in order to move therewith. For the purpose of retaining the pinion 17 in proper position, we may employ a collar 20 above the pinion and having its upper end in contact with the top of the casing. The pinion 17 is in constant mesh with the gear 10 so as to be driven thereby in all of its movements. The shaft 16, as shown in Fig. 4, is also provided with pinions $17^a$ and $18^a$ preferably corresponding in size and vertical position with the pinions 17 and 18, said pinions $17^a$ and $18^a$, however, being loosely mounted on the shaft 16. The pinion $17^a$, like pinion 17, is in constant mesh with the gear 10, but said pinions 17 and $17^a$ are so positioned with respect to each other as to be free from positive gear connection with each other, being positioned to prevent any mesh engagement therebetween. On the contrary, the pinions 18 and $18^a$ are in constant mesh so as to provide a drive engagement therebetween under certain conditions to be named. For the purpose of positioning the gears $17^a$ and $18^a$, we employ collars $19^a$ and $20^a$ corresponding to the collars 19 and 20 of the shaft 15.

The pinions $17^a$ and $18^a$ are adapted to be operatively connected to the shaft for the purpose of communicating the motion of these pinions to the shaft, and we preferably employ the same type of connecting mechanism for each of said pinions. These connections comprise substantially three elements, i. e., a sleeve 21 mounted on the collar $19^a$ or collar $20^a$, as the case may be, each sleeve having its upper edge provided with an open-ended recess 22 extending longitudinally thereof adapted to receive a pin 23 projecting radially from the shaft 16, the recess being of a length sufficient to permit a sliding movement of the collar axially on the collar $19^a$ or $20^a$ which acts as a bushing. The lower edge of the sleeve 21 is formed with a succession of cam faces 24, which form shoulders 25 located in the path of movement of a pin 26 carried by the pinion $17^a$ or $18^a$, as the case may be. Said pins extending parallel to the axis of the pinions. As shown in Fig. 1, the cam faces 24 are arranged similarly in connection with both pinions $17^a$ and $18^a$, and the construction provides for an engagement of a pin 26 with its coöperating shoulders 25 when the gear is moved in one direction, and an axial sliding movement of the sleeve 21 when the gear rotates in the opposite direction, the pin 26 riding over the cam faces 24.

With the parts assembled in this manner, the operation will be as follows:—With the gear 10 moving in the direction shown by the arrow in Fig. 3, the pinions 17 and $17^a$ will be rotated in the direction of the arrows shown in said figure, both of said pinions being positively driven, the pinion 17 causing the shaft 15 to rotate in a similar direction, while the pinion $17^a$ will have its pin 26 engage a shoulder 25 of its sleeve 21, causing said pinion $17^a$ to drive the shaft 16 in a corresponding direction. In view of the fact that the pinion $18^a$ is loose on the shaft 16, the motion of pinion 18 will cause said pinion $18^a$ to move in a direction where its pin 26 will ride over the cam faces 24 of its sleeves 21, the movements of the shaft 15 and pinions 17, 18 and $18^a$ performing no work, running idle, the shaft 16 being driven from gear 10 through the pinion $17^a$ and its connections with the shaft.

When the movement of the gear 10 is reversed, the movements of pinions 17 and $17^a$ will also be provided, this reversal of movement immediately changing the pinion $17^a$ from a working pinion to an idler, due to the fact that this change in direction of rotation of such pinion causes its pin 26 to ride over the cam faces 24 of its sleeve 21, thus operatively disconnecting this pinion from the shaft 16. At the same time, the pinion 18, by reason of its being secured to the shaft 15, acts to move the pinion $18^a$ in a direction to cause the pin 26 of the latter to engage a shoulder 25 of its sleeve 21, thus causing the shaft 16 to be driven in the same direction in which it had been moving under the previous driving action of pinion $17^a$.

From the above it will be readily seen that when the drive is through the pinion $17^a$, both shafts 15 and 16 will rotate in the same direction (counterclockwise when the arrangement of parts is such as shown in the drawings), while said shafts will rotate in opposite directions when the power is provided through pinion 17, so that while shaft 16 rotates constantly in one direction, shaft 15 will oscillate, with its directions of movement exactly opposite to those of the gear 10. By this construction we are able to convert the oscillatory motion of a single gear into a continuous rotary motion of another shaft without the intervention of an additional gear mounted on the mechanism for imparting the oscillatory movement to the power gear or gears, thereby avoiding unnecessary friction and permitting of the formation of a mechanism which may be relatively small and occupy but little space, making the structure especially desirable in connection with installations where a small and comparatively inconspicuous operation is to be had. Furthermore, the particular arrangement and relationship of the parts is such as to provide for a minimum friction, loss of power and amount of noise, the device as a whole providing an exceedingly light-running operation; and since the friction is comparatively small, it will be readily understood that the device is durable, not liable to get out of order and can be readily repaired or cleaned when necessary.

While we have herein disclosed a preferred way in which the mechanism may be provided, it is obvious that changes and modifications therein may be desired or found necessary under the exigencies of use, and we desire it understood that we reserve the right to make any and all such changes and modifications as may be found desirable or necessary in so far as they may follow within the spirit and scope of the invention as expressed in the following claims.

Having thus described our invention, what we claim as new is;—

1. In a mechanical movement for converting oscillatory motion to a continuous rotary motion, an oscillatory power gear, a shaft adapted to be connected to the work, a supplemental shaft, two pinions carried by each of said shafts, said pinions being correspondingly positioned, one pinion of each shaft being in constant mesh with a pinion of the other shaft, the remaining pinions being in constant mesh with the power gear and out of mesh with each other, and means on the work shaft for operatively connecting either of its pinions thereto.

2. In a mechanical movement for converting oscillatory motion to a continuous rotary motion, an oscillatory power gear, a shaft adapted to be connected to the work, a supplemental shaft, two pinions carried by each of said shafts, said pinions being correspondingly positioned, one pinion of each shaft being in constant mesh with a pinion of the other shaft, the remaining pinions being in constant mesh with the power gear and out of mesh with each other, and means on the work shaft for operatively connecting either of its pinions thereto, said means comprising a sleeve carried by and moving with said work shaft and movable axially thereon, said sleeve and its pinion having complemental means for operatively connecting or disconnecting them together depending upon the direction of movement of the pinion.

3. In a mechanical movement for converting oscillatory motion to a continuous rotary motion, an oscillatory power gear, a shaft adapted to be connected to the work, a supplemental shaft, two pinions carried by each of said shafts, said pinions being correspondingly positioned, one pinion of each shaft being in constant mesh with a pinion of the other shaft, the remaining pinions being in constant mesh with the power gear and out of mesh with each other, and means on the work shaft for operatively connecting either of its pinions thereto, said means comprising a sleeve carried by and moving with said work shaft and movable axially thereon, said sleeve and its pinion having complemental means for operatively connecting or disconnecting them together depending upon the direction of movement of the pinion, said latter means embodying a pin carried by the pinion and a cam face formed on the end of the sleeve, said face being adapted to form a shoulder in the path of movement of the pin in one direction.

4. In a mechanical movement, an oscillatory gear, a pair of shafts external of said gear, one of said shafts being adapted to be operatively connected to the work, pinions carried by said shafts, each of said shafts having a pinion in constant mesh with said gear and out of mesh with each other, and each shaft also having a pinion in constant mesh with the pinion of the other shaft, the pinions of the work shaft being loosely mounted on said shaft, the pinions of the other shaft being secured to move in unison with said shaft, each of the pinions of the work shaft having a pin extending in parallelism with the shaft axis and projecting laterally from the side thereof, said work shaft having an independent sleeve for each of its pinions, said sleeves being movable axially and each having a cam face on its edge adjacent its pinion, said cam face providing a shoulder in the path of movement of the pin when the latter is movable in one direction to drive the shaft, the cam faces of said sleeves being arranged in such manner that the movement of said power gear in one direction will cause one of the pinions of the work shaft to drive said shaft while a movement of said gear in the opposite direction will cause the other pinion of that shaft to provide the drive operation.

In testimony whereof we affix our signatures in the presence of two witnesses.

EDWARD A. DEWALD.
AARON ROSENSON.

Witnesses:
MAX H. SROLOVITZ,
H. C. EVERT.

---

Copies of this patent may be obtained for five cents each, by addressing the "Commissioner of Patents, Washington, D. C."